United States Patent
Georgoulias et al.

(10) Patent No.: US 11,212,960 B2
(45) Date of Patent: Jan. 4, 2022

(54) REEL MOWER CUTTING UNIT STEERING LIMITERS

(71) Applicant: Deere & Company, Moline, IL (US)

(72) Inventors: Chris M. Georgoulias, Apex, NC (US); Brent G. Rinholm, Fuquay Varina, NC (US)

(73) Assignee: DEERE & COMPANY, Moline, IL (US)

(*) Notice: Subject to any disclaimer, the term of this patent is extended or adjusted under 35 U.S.C. 154(b) by 654 days.

(21) Appl. No.: 16/102,175

(22) Filed: Aug. 13, 2018

(65) Prior Publication Data

US 2020/0045882 A1 Feb. 13, 2020

(51) Int. Cl.
*A01D 34/43* (2006.01)
*A01D 75/30* (2006.01)
*A01D 101/00* (2006.01)

(52) U.S. Cl.
CPC ........... *A01D 34/43* (2013.01); *A01D 75/303* (2013.01); *A01D 2101/00* (2013.01)

(58) Field of Classification Search
CPC ........ A01D 34/43; A01D 34/47; A01D 34/53; A01D 75/303; A01D 75/306; A01D 75/30; A01D 34/44; A01D 57/04; A01D 67/005
See application file for complete search history.

(56) References Cited

U.S. PATENT DOCUMENTS

| | | | |
|---|---|---|---|
| 1,614,333 A * | 1/1927 | Worthington | A01D 75/306 56/13.6 |
| 1,712,722 A * | 5/1929 | Worthington | A01D 75/306 56/7 |
| 1,904,376 A * | 4/1933 | Kruckemeyer | A01D 75/306 56/7 |
| 2,145,440 A * | 1/1939 | George | A01D 75/306 56/7 |
| 3,599,406 A * | 8/1971 | Akgulian | A01D 34/43 56/17.2 |
| 3,771,296 A | 11/1973 | Sorenson et al. | |
| 3,824,772 A | 7/1974 | Sorenson et al. | |
| 4,707,971 A | 11/1987 | Forpahl et al. | |
| 4,769,976 A | 9/1988 | Bassett et al. | |
| 5,293,729 A * | 3/1994 | Curry | A01D 75/30 56/15.8 |
| 5,343,680 A | 9/1994 | Reichen et al. | |
| 5,459,984 A * | 10/1995 | Reichen | A01D 75/30 56/7 |

(Continued)

FOREIGN PATENT DOCUMENTS

| | | | |
|---|---|---|---|
| EP | 1588602 A1 | 10/2005 | |
| GB | 718840 A * | 11/1954 | A01D 75/306 |

OTHER PUBLICATIONS

European Search Report issued in counterpart European Patent Application No. 19188850.2 dated Dec. 20, 2019 (7 pages).

*Primary Examiner* — Thomas B Will
*Assistant Examiner* — Joan D Misa

(57) ABSTRACT

A pair of reel mower cutting unit steering limiters including a pair of pivoting members that may be independently pivoted between an engaged position providing a full range of steering of a reel mower cutting unit in a first direction on a vertical yaw axis, and a disengaged position reducing the steering of the reel mower cutting unit in the first direction. The maximum steering angle may be independently adjustable in each direction.

13 Claims, 4 Drawing Sheets

(56) References Cited

U.S. PATENT DOCUMENTS

| | | | |
|---|---|---|---|
| 5,623,817 A | 4/1997 | Bricko et al. | |
| 5,628,169 A * | 5/1997 | Stiller | A01D 34/43 |
| | | | 56/249 |
| 6,098,388 A * | 8/2000 | Davies | A01D 34/62 |
| | | | 56/249 |
| 6,341,478 B1 | 1/2002 | Sallstrom et al. | |
| 8,544,251 B2 * | 10/2013 | Goman | A01D 34/54 |
| | | | 56/249 |
| 8,777,508 B2 * | 7/2014 | Phillips | A01D 34/43 |
| | | | 403/96 |
| 8,850,783 B2 | 10/2014 | Goman et al. | |
| 9,027,318 B2 * | 5/2015 | Akahane | A01D 34/47 |
| | | | 56/249 |
| 10,390,488 B2 * | 8/2019 | Georgoulias | A01D 34/62 |
| 2013/0160413 A1 | 6/2013 | Coffin | |

* cited by examiner

REEL MOWER CUTTING UNIT STEERING LIMITERS

FIELD OF THE INVENTION

The present invention relates to grass mowing machines, and more specifically to reel mower cutting units for triplex greensmowers and fairway mowers.

BACKGROUND OF THE INVENTION

Grass mowing machines used to mow golf courses, parks, and athletic fields where a high quality of cut is desired, may include three or more reel mower cutting units. Triplex greensmowers have two forward reel mower cutting units followed by a center or rear reel mower cutting unit positioned under the vehicle frame and the operator station. Fairway mowers typically have three forward reel mower cutting units followed by two rear reel mower cutting units. Each reel mower cutting unit may be mounted to a lift arm that may be used to raise and lower the cutting unit between a mowing position and a transport position. Reel mower cutting units have front and rear rollers, spiral cutting blades rotating in close proximity to a bedknife, and may have a removable grass catcher mounted in front of the cutting unit.

When mowing across hillsides with a triplex greensmower or fairway mower, reel mower cutting units have a tendency to twist and turn towards the bottom of the hill because of the force of gravity. The back of the triplex greensmower or fairway mower also may twist and turn down the hill, changing the angle of the mower from the desired mowing path. The reel mower cutting units and mower may crab along the mowing path, and the reel mower cutting units may unlap and leave uncut strips of grass between them. Similarly, the front reel mower cutting units on a triplex greensmower or fairway mower may turn inwardly from the desired mowing path when verticutting.

To prevent the unwanted twisting and turning, some triplex greensmowers or fairway mowers have removable pins to lock out steering motion of the reel mower cutting units. However, removable pins lock out steering motion of the reel mower cutting units in both directions, which may result in dragging the reel mower cutting units and damaging the turf when turning uphill while mowing, or when turning outwardly while verticutting.

There is a need for steering limiters that prevent reel mower cutting units on triplex greensmowers or fairway mowers to turn in one direction but not the other. There is a need for steering limiters that prevent reel mower cutting units on triplex greensmowers or fairway mowers from twisting or turning towards the bottom of a hill, but that allow turning the reel mower cutting units uphill. There is a need for steering limiters that prevent reel mower cutting units from turning inwardly while verticutting, but that allow the reel mower cutting units to turn outwardly. There is a need for steering limiters for reel mower cutting units on triplex greensmowers or fairway mowers that improve the quality of cut, reduce uncut strips of grass, and track straight when verticutting.

SUMMARY OF THE INVENTION

Reel mower cutting unit steering limiters include a pair of pivoting members are mounted on a yoke mount that is pivotably connected to a forward end of a lift arm of a greensmower having a plurality of reel mower cutting units. Each pivoting member may independently pivot between an engaged position providing a full range of steering of a reel mower cutting unit in a first direction on a vertical yaw axis, and a disengaged position reducing the steering of the reel mower cutting unit in the first direction.

DESCRIPTION OF PREFERRED EMBODIMENT

Figure 1:
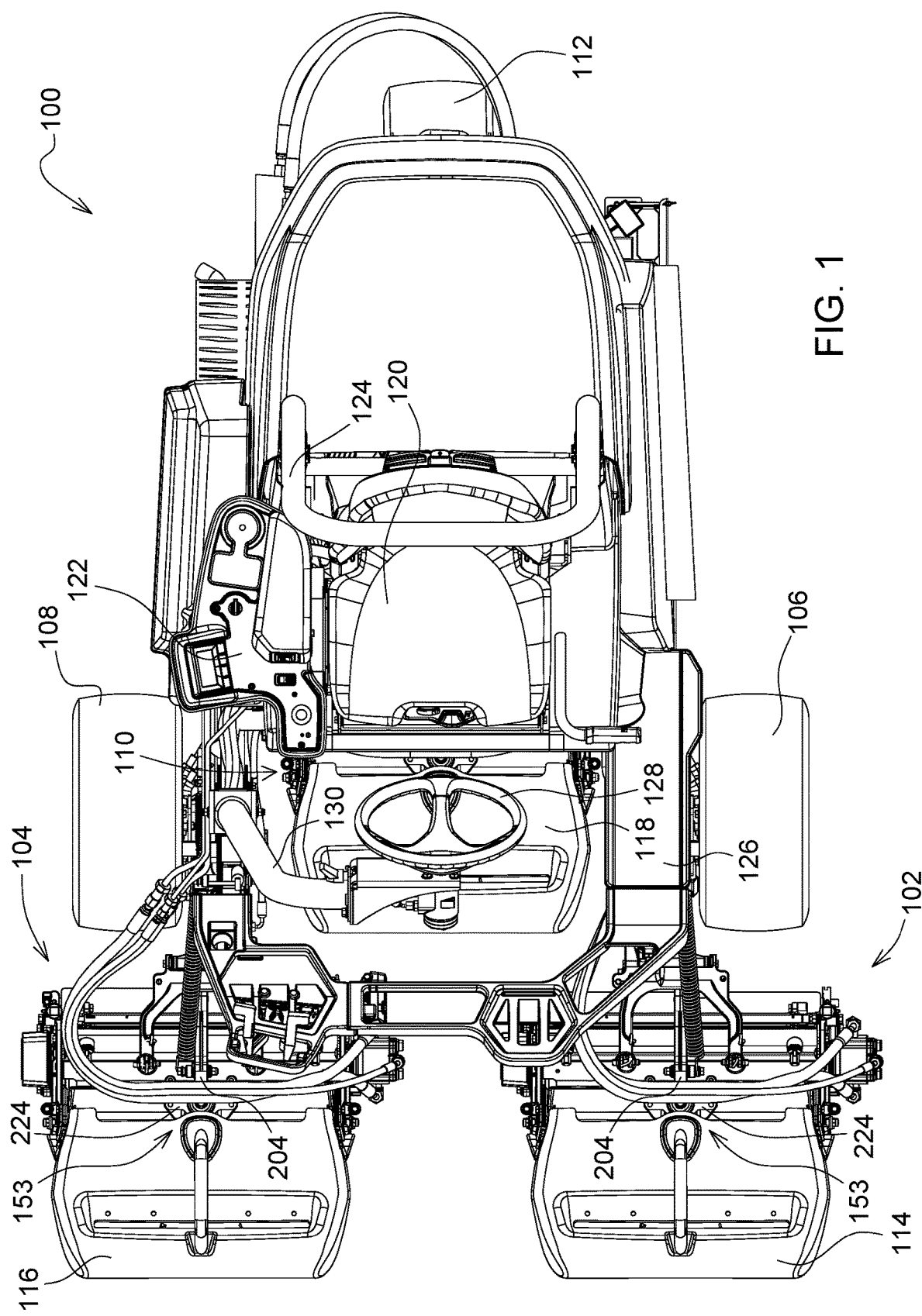
FIG. 1 is a top view of a triplex greensmower with reel mower cutting unit steering limiters according to a first embodiment.
Figure 2:
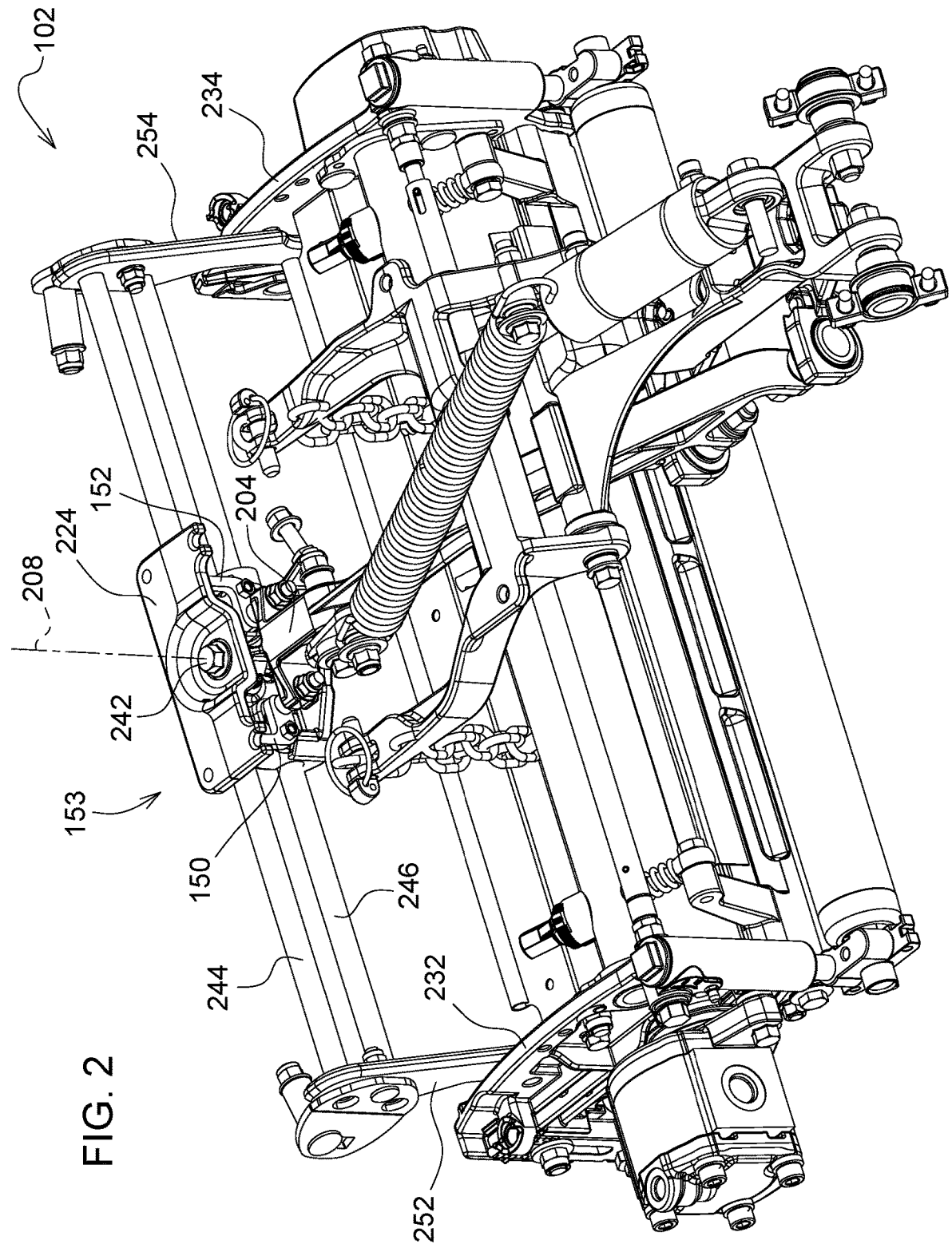
FIG. 2 is a top perspective view of a reel mower cutting unit with steering limiters according to a first embodiment.
Figure 3:
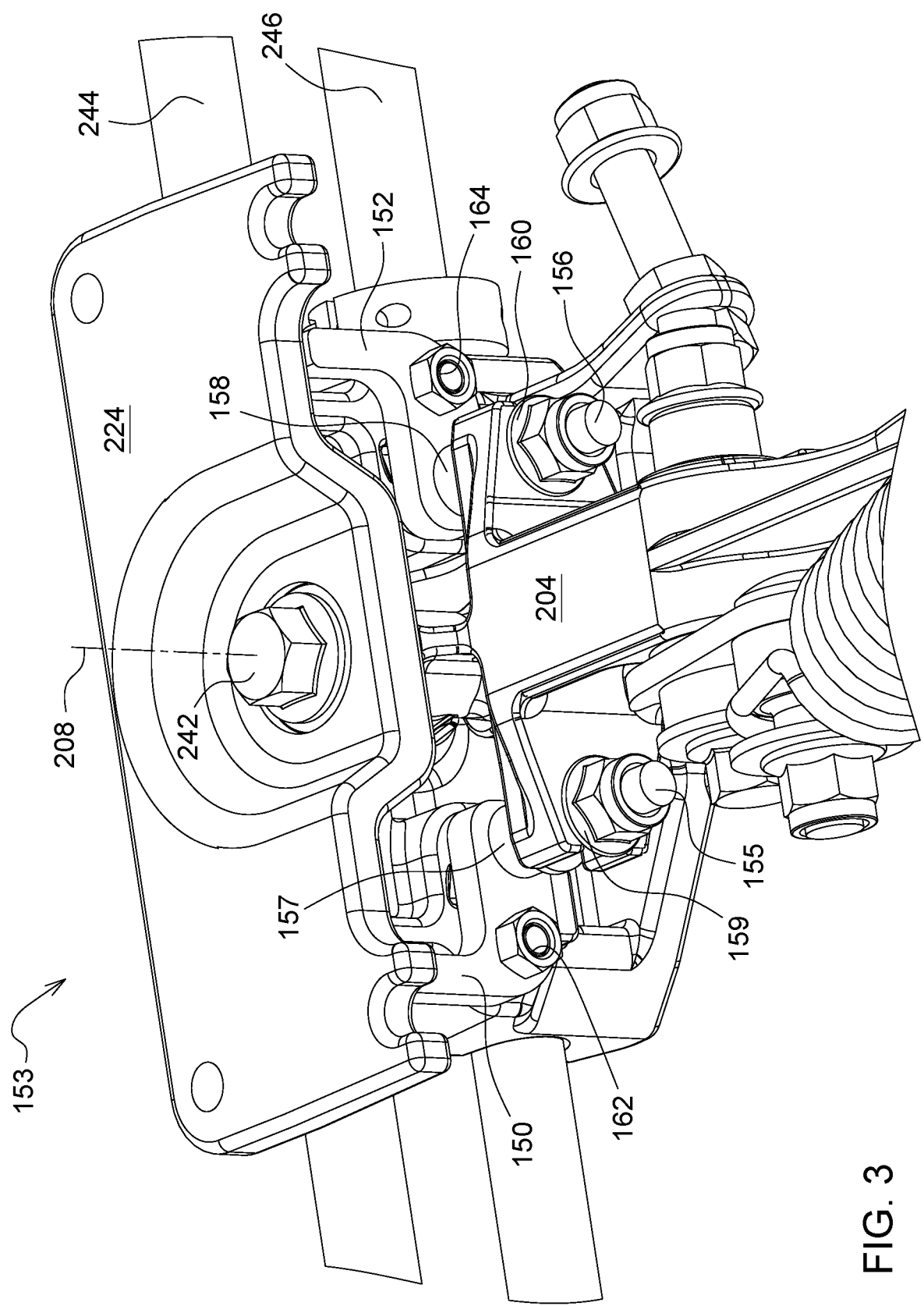
FIG. 3 is a top perspective view of reel mower cutting unit steering limiters with both steering limiters actuated according to a first embodiment.
Figure 4:
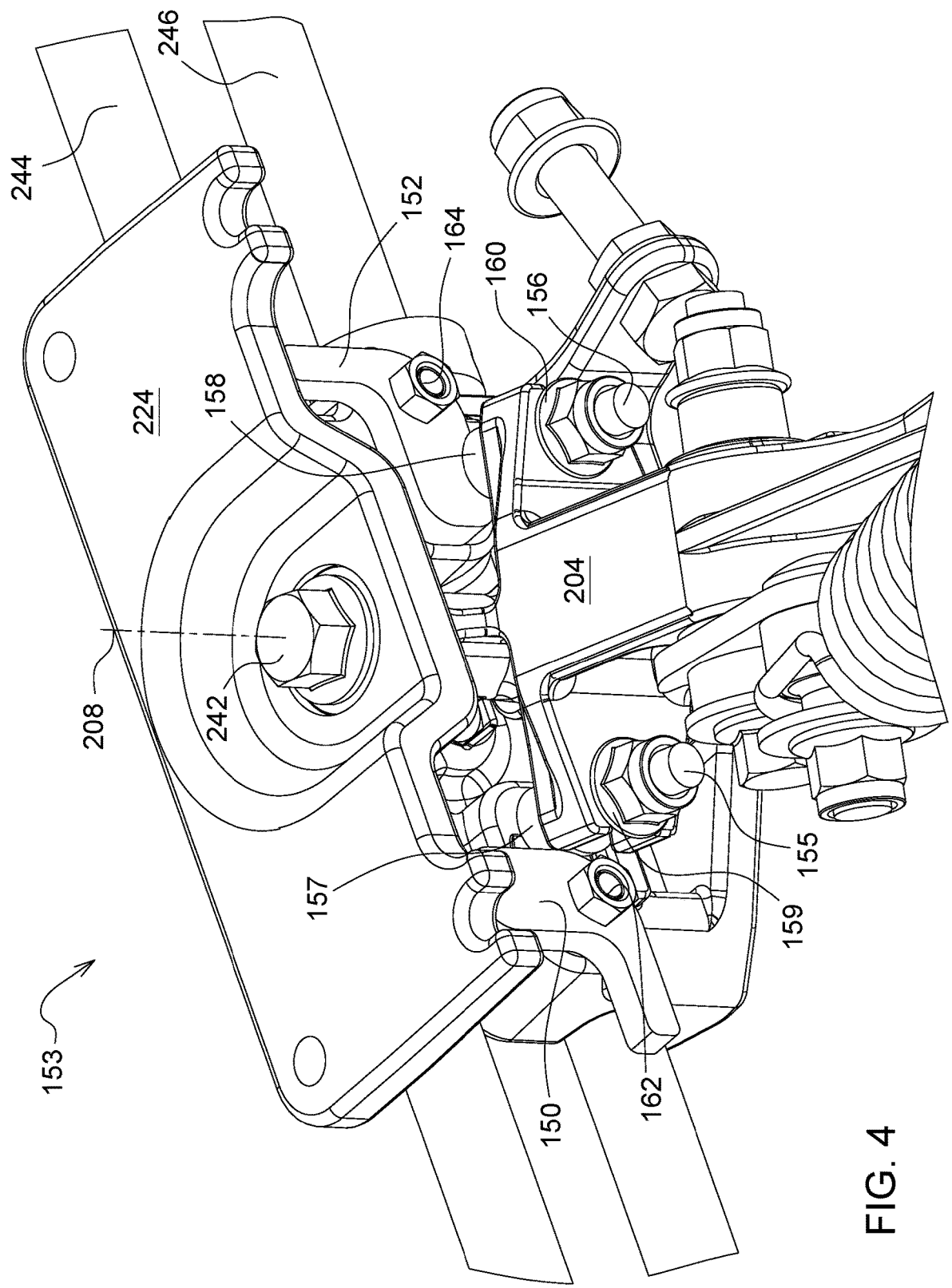
FIG. 4 is. is a top perspective view of reel mower cutting unit steering limiters with the right steering limiter actuated according to a first embodiment.

In a first embodiment shown in FIGS. 1-4, a pair of steering limiters 150, 152 may be provided on each front reel mower cutting unit 102, 104 of triplex greensmower 100. The steering limiters may be attached to steering yoke 153 for limiting or locking out steering or turning motion of the reel mower cutting unit. One of the steering limiters may be pivotably attached on each side of the steering yoke. Each steering limiter may be actuated or engaged to limit or prevent steering or turning motion in one direction, or unactuated or disengaged to allow the full range of steering in that direction.

In one embodiment, each pair of steering limiters 150, 152 may be provided on one of front reel mower cutting units 102, 104, which are positioned side-by-side forwardly of left and right drive wheels 106, 108. Optionally, an additional pair of steering limiters also may be provided on the steering yoke of center or rear reel mower cutting unit 110, which may be positioned behind the drive wheels and in front of steerable rear wheel 112. The steering limiters also may be used on fairway mowers having 5 or more reel mower cutting units. Grass catchers 114, 116 and 118 may be removably attached to the front of each of the reel mower cutting units. An electric or hydraulic motor may rotate each cutting reel and may be mounted to one side of the reel mower cutting unit. The triplex greensmower also may have operator seat 120 between the drive wheels and rear wheel, console 122 adjacent the operator seat, and roll over protection system or ROPS 124 attached to the frame behind and alongside the operator seat. Step 126 may be mounted to the frame of the triplex greensmower to the left side and below the operator seat, and steering wheel 128 may be mounted on steering column 130 to the right and in front of the operator seat.

In one embodiment, each pair of steering limiters 150, 152 may be provided on a reel mower cutting unit connected to steering yoke 153 attached to the forward end of upper lift arm 204. For example, steering yoke 153 may include yoke mount 224 that may be pivotably connected to the forward end of the upper lift arm. The steering yoke may provide a vertical yaw axis 208 that is perpendicular to the ground plane as the mower turns, and may be forward of the center of gravity of the reel mower cutting unit. A vertical bolt or rod 242 may be inserted through the yoke mount, enabling the yoke mount to pivot on yaw axis 208. The front of yoke mount 224 may include a pair of channels or grooves where upper rod 244 and lower rod 246 may be secured and clamped. Yoke arms 252, 254 may be attached to the ends of the upper and lower rods, and extend downwardly where they may be pivotably mounted to side panels 232, 234 of the reel mower cutting unit.

In one embodiment, the pair of steering limiters may include left steering limiter 150 pivotably attached on the left side of yoke mount 224, and right steering limiter 152 pivotably attached on the right side of yoke mount 224. Alternatively, the left and right steering limiters may be pivotably attached to the left and right forward ends of upper lift arm 204. Each steering limiter may be generally L-shaped with pivot axis 162, 164 at or adjacent the corner of the L. Each steering limiter also may have an over center mass on one side of the L or pivot axis to help the steering limiter remain in either the engaged or actuated position, or in the disengaged or unactuated position. Alternatively, the steering limiters may have other configurations and may use friction to stay in either of the positions.

In one embodiment, the operator may move each steering limiter 150, 152 independently between the engaged or actuated, and the disengaged or unactuated positions. Once the operator moves both steering limiters to their disengaged or unactuated positions, the reel mower cutting unit may have a full range of steering on yaw axis 208. For example, the full range of steering may be in the range of about 18 degrees to the left and the right of a straight ahead mowing position. If the operator pivots only left steering limiter 150 to the engaged or actuated position, the left steering limiter may prevent, reduce or limit steering the reel mower cutting unit to the left on yaw axis 208, and when the operator pivots only right steering limiter 152 to the engaged position, the right steering limiter may prevent, reduce or limit steering the reel mower cutting unit to the right on yaw axis 208. When the operator pivots both steering limiters to their engaged or actuated positions, the steering limiters may prevent, reduce or limit steering the reel mower cutting unit in either direction.

In one embodiment, each steering limiter 150, 152 may be engaged or actuated when it is positioned between the forward end of upper lift arm 204 and yoke mount 224. When engaged or actuated, left steering limiter 150 may be positioned between the left forward end of upper lift arm 204 and the left side of yoke mount 224, and right steering limiter 152 may be positioned between the right forward end of upper lift arm 204 and the right side of yoke mount 224. When engaged or actuated, the left steering limiter may take up the space and fill the gap between the left forward end of the upper lift arm and the left side of the yoke mount, blocking the reel mower cutting unit from making left turns. When engaged or actuated, the right steering limiter may take up the space and fill the gap between the right forward end of the upper lift arm and the right side of the yoke mount, blocking the reel mower cutting unit from making right turns.

In one embodiment, each steering limiter 150, 152 may be independently adjustable by the operator to set a maximum steering angle in the engaged and disengaged positions. For example, the left steering limiter may be set to a maximum steering angle such as 0 degrees in the engaged position, and a maximum steering angle such as 18 degrees in the disengaged position. The right steering limiter may be set to the same maximum steering angles as the left, or set to different maximum steering angles such as 3 degrees when engaged and 9 degrees when disengaged. The operator may set the maximum steering angles by adjusting the gap or space between the forward end of the lift arm and the yoke mount, to reduce or eliminate the maximum steering angle in each direction. For example, the maximum steering angle adjustment may be done using threaded fasteners 155, 156 mounted to the left and right forward ends of upper lift arm 204. For example, the forward end of upper lift arm 204 may be generally T-shaped. Each threaded fastener may have a head 157, 158 which may project forwardly from the upper lift arm toward the yoke mount and provide a stop. The head of each threaded fastener may abut the steering limiter when the steering limiter is engaged, and may abut the yoke mount when the steering limiter is disengaged. The operator may change the maximum steering angle by moving the position of the threaded fastener head relative to the yoke mount, and/or inserting a washer or spacer 159, 160 around the threaded fastener to move the head relative to the yoke mount. Alternatively, the maximum steering angle may be changed in discrete increments by providing one or more steps on the surface of each steering limiter.

In one embodiment, the pair of steering limiters 150, 152 may help the reel mower cutting units track the desired mowing path when mowing across hillsides. The steering limiters may help maintain optimal reel mower cutting unit positions by limiting downhill steering motion of each front reel and allowing full uphill motion. Similarly, the steering limiters may help the reel mower cutting units track in a straight path when verticutting by limiting or reducing only the inward steering motion of the front reel mower cutting units, while allowing the reel mower cutting units to steer or turn outwardly.

Having described the preferred embodiment, it will become apparent that various modifications can be made without departing from the scope of the invention as defined in the accompanying claims:

The invention claimed is:

1. A pair of reel mower cutting unit steering limiters, comprising:
   a pair of pivoting members mounted on a yoke mount that is pivotably connected to a forward end of a lift arm of a greensmower having a plurality of reel mower cutting units;
   each pivoting member independently pivoting between a disengaged position providing a full range of steering of a reel mower cutting unit in a first direction on a vertical yaw axis, and an engaged position reducing the steering of the reel mower cutting unit in the first direction.

2. The pair of reel mower cutting unit steering limiters of claim 1 wherein each pivoting member is positioned between a forward end of the lift arm and the yoke mount when the pivoting member is engaged.

3. The pair of reel mower cutting unit steering limiters of claim 1 wherein each pivoting member is independently adjustable to a maximum steering angle in the engaged and disengaged positions.

4. The pair of reel mower cutting unit steering limiters of claim 3 wherein the maximum steering angle is set by adjusting a gap between the forward end of the lift arm and the yoke mount.

5. The pair of reel mower cutting unit steering limiters of claim 4 wherein the forward end of the lift arm is T-shaped.

6. A pair of reel mower cutting unit steering limiters, comprising:
   a pair of pivoting members mounted between a forward end of a lift arm and a yoke mount attached to the lift arm; each pivoting member preventing steering of a reel mower cutting unit in only one of a left direction and a right direction on a yaw axis when in an engaged position, and allowing steering of the reel mower cutting unit in the same direction when in a disengaged position.

7. The pair of reel mower cutting unit steering limiters of claim 6 wherein each pivoting member is positioned in a gap between the forward end of the lift arm and the yoke mount in the engaged position.

8. The pair of reel mower cutting unit steering limiters of claim 6 wherein each of the pair of pivoting members is biased to stay in the engaged position.

9. The pair of reel mower cutting unit steering limiters of claim 6 wherein each of the pivoting members is independently adjustable to a maximum steering angle in the engaged position.

10. A pair of reel mower cutting unit steering limiters, comprising:
    a pair of pivoting members that are independently pivoted between a disengaged position providing a full range of steering of a reel mower cutting unit in a first direction on a vertical yaw axis, and an engaged position reducing the steering of the reel mower cutting unit in the first direction;
    each of the pair of pivoting members being independently adjustable to a higher maximum steering angle in the disengaged position than in the engaged position.

11. The pair of reel mower cutting unit steering limiters of claim 10 wherein the maximum steering angle in each direction is independently adjustable with a pair of threaded fasteners.

12. The pair of reel mower cutting unit steering limiters of claim 10 wherein each of the pair of pivoting members are inserted between a forward end of a T-shaped lift arm and a yoke mount.

13. The pair of reel mower cutting unit steering limiters of claim 10 wherein the pair of pivoting members are L-shaped.

* * * * *